(12) United States Patent
Gugel et al.

(10) Patent No.: US 10,352,402 B2
(45) Date of Patent: Jul. 16, 2019

(54) GROUP MANUAL TRANSMISSION

(71) Applicant: Deere & Company, Moline, IL (US)

(72) Inventors: Rainer Gugel, Plankstadt (DE); David Müller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 356 days.

(21) Appl. No.: 15/297,175

(22) Filed: Oct. 19, 2016

(65) Prior Publication Data

US 2017/0114865 A1    Apr. 27, 2017

(30) Foreign Application Priority Data

Oct. 22, 2015    (DE) .................. 10 2015 220 627

(51) Int. Cl.
| | |
|---|---|
| *F16H 3/08* | (2006.01) |
| *F16H 3/093* | (2006.01) |
| *F16H 3/00* | (2006.01) |
| *F16H 37/08* | (2006.01) |
| *F16H 37/04* | (2006.01) |
| *F16H 3/66* | (2006.01) |

(52) U.S. Cl.
CPC ............ *F16H 3/093* (2013.01); *F16H 3/006* (2013.01); *F16H 37/042* (2013.01); *F16H 37/0813* (2013.01); *F16H 3/66* (2013.01); *F16H 2003/0826* (2013.01)

(58) Field of Classification Search
CPC . F16H 3/093; F16H 3/006; F16H 3/10; F16H 37/043; F16H 2003/007
USPC ................... 74/330, 331, 333, 340
See application file for complete search history.

(56) References Cited

U.S. PATENT DOCUMENTS

| | | | | |
|---|---|---|---|---|
| 3,589,483 A | * | 6/1971 | Smith ..................... | F16H 3/097 192/3.52 |
| 7,383,749 B2 | * | 6/2008 | Schafer ................... | F16H 3/006 74/330 |
| 9,003,905 B1 | * | 4/2015 | Lee ......................... | F16H 3/093 74/330 |
| 9,145,952 B2 | * | 9/2015 | Lee ......................... | F16H 3/12 |

(Continued)

FOREIGN PATENT DOCUMENTS

| | | |
|---|---|---|
| DE | 4020558 A1 | 1/1991 |
| DE | 10225331 A1 | 12/2003 |

(Continued)

OTHER PUBLICATIONS

European Search Report in foreign counterpart application 16194725.4, dated Apr. 25, 2017 (6 pages).

*Primary Examiner* — Ha Dinh Ho

(57) ABSTRACT

A group manual transmission has an input shaft and an output shaft, on which gears of gear pairs of at least two switch groups are coaxially arranged, wherein the input shaft can be brought into a drive-connection with the output shaft via a gear pair of a switch group. A coupling shaft is provided, which is non-rotatably connected with a coupling-switch device for the acceptance of several switching positions. In a coupling-switching position, the coupling shaft is drive-connected with a gear pair of a switch group via the coupling-switch device for the transfer of a power flow via the coupling shaft to the output shaft. In an interruption-switching position, the drive connection between the coupling shaft and this gear pair is interrupted.

20 Claims, 7 Drawing Sheets

(56) References Cited

U.S. PATENT DOCUMENTS

| | | | |
|---|---|---|---|
| 9,518,633 B2* | 12/2016 | Lee | F16H 3/006 |
| 9,605,731 B2* | 3/2017 | Lee | F16H 3/093 |
| 2007/0180942 A1* | 8/2007 | Antonov | F16H 3/006 |
| | | | 74/340 |
| 2007/0199393 A1* | 8/2007 | Hattori | F16H 3/006 |
| | | | 74/331 |

FOREIGN PATENT DOCUMENTS

| | | |
|---|---|---|
| DE | 10232833 A1 | 2/2004 |
| DE | 102010039349 A1 | 2/2012 |
| DE | 102011088374 A1 | 6/2013 |
| DE | 102012208126 A1 | 11/2013 |
| EP | 0984202 A1 | 3/2000 |
| WO | 2005103525 A1 | 11/2005 |
| WO | 2015145553 A1 | 10/2015 |

* cited by examiner

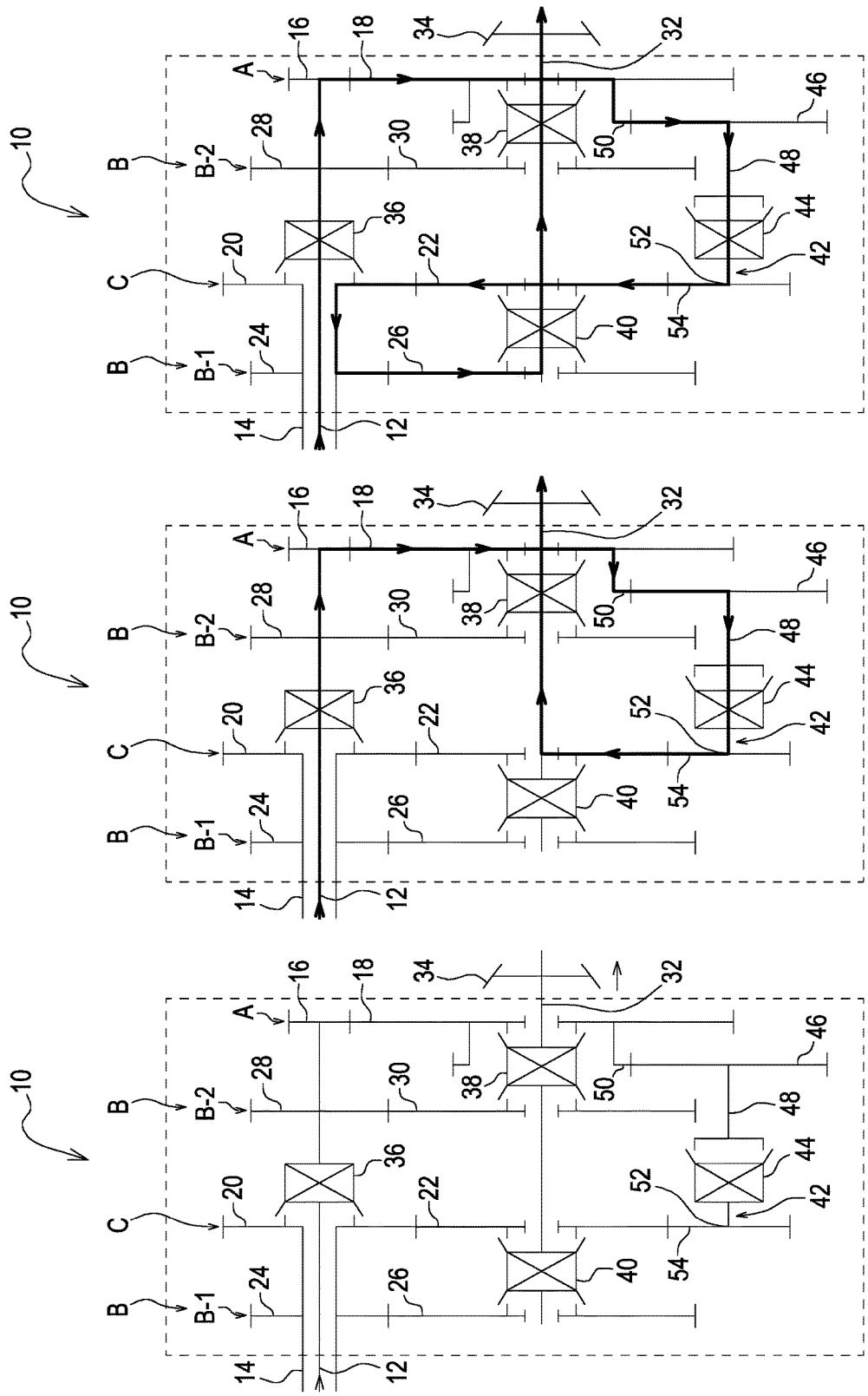

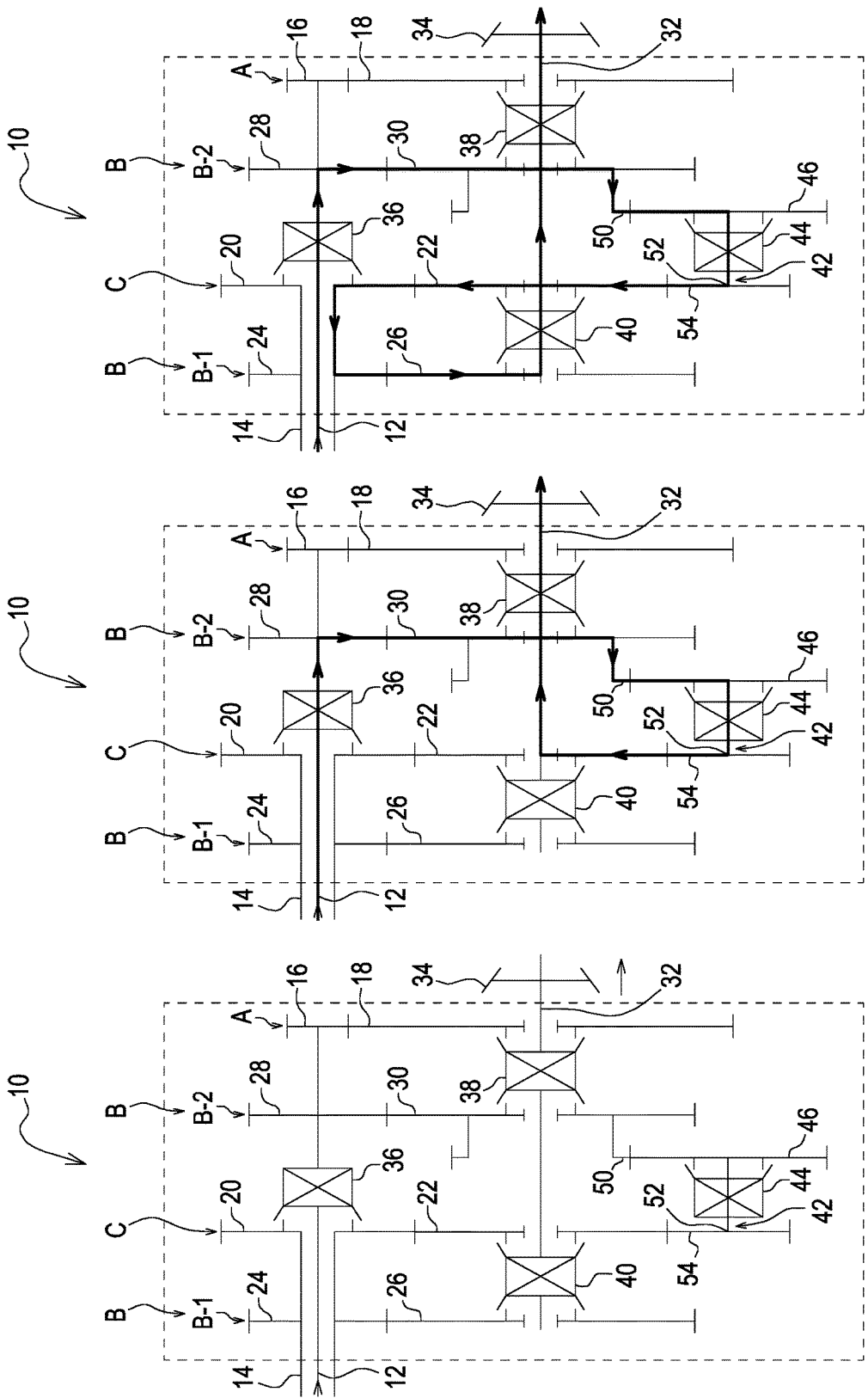

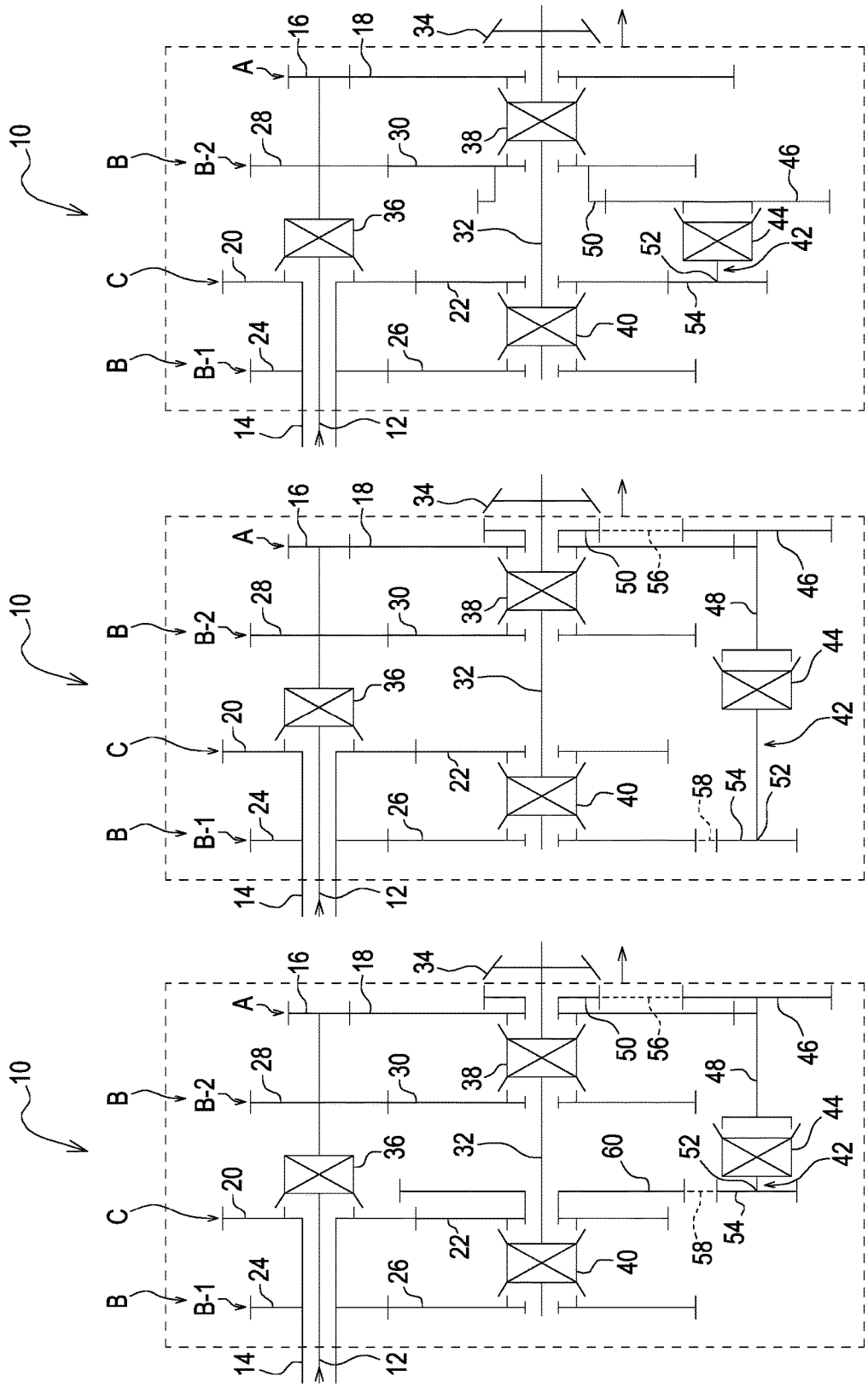

GROUP MANUAL TRANSMISSION

CROSS-REFERENCE TO RELATED APPLICATIONS

Pursuant to 35 USC § 119, this application claims the benefit of and priority to German patent application no. 102015220627.0, filed on Oct. 22, 2015, which is herein incorporated by reference in its entirety.

FIELD OF THE DISCLOSURE

The disclosure concerns a manual transmission having gear units arranged one behind the other.

BACKGROUND

In the state of the art, gear arrangements for agricultural working vehicles are known, for example, for tractors or harvesters, which have several gear units arranged one behind the other. Such gear arrangements are used to satisfy the high demands with respect to the most finely possible graduated spread of the gear or also the widest one, as is required in agricultural working vehicles. For the same reasons, such gear arrangements are also used in the areas of commercial vehicles and construction machines.

DE 10 2012 208 125 A1 provides information regarding a gear arrangement with several gear units which are connected, one behind the other, in a power flow direction. Various gear units, such as a planetary gear, a dual clutch transmission, a reduction stage, and a group manual transmission, are combined with one another. The group manual transmission thereby has an input shaft, an output shaft, and several transmission groups for various speed stages. The reduction stage—also called a creeper gear when applied in agricultural vehicles—is upstream from the group manual transmission in the power flow direction and allows the preparation of a so-called creeper speed, so as to cover very low speed ranges. These are needed, for example, in certain maintenance tasks, the distribution of seed crops or harvesting work.

SUMMARY

The goal of the disclosure is to combine a creeper speed function, in a technically simple manner, with a group manual transmission.

This goal is attained according to the teaching of independent Claim 1. Several advantageous developments and refinements of the disclosure can be deduced from the subclaims.

According to the disclosure, a group manual transmission has an input shaft and an output shaft, on whose gears at least two transmission groups are coaxially arranged, wherein the input shaft can be brought into a drive connection with the output shaft via a gear pair of a transmission group. The input shaft and the output shaft are thereby combined with a coupling shaft, which is non-rotatably connected with a coupling-transmission device for the acceptance of several transmission positions. The transmission positions of the coupling transmission device comprise at least one coupling-transmission and an interruption-transmission position. In the coupling-transmission position, the coupling shaft is connected for drive, via the coupling-transmission device, with a gear of a transmission group, so that a power flow can be transferred to the output shaft via the coupling shaft. In the interruption-transmission position, the so-called work connection between the coupling shaft and the corresponding gear pair is interrupted.

The steering of the coupling-transmission device into the coupling-transmission position can correspond to the engaging of the creeper speed or at least the pre-engaging of the creeper speed.

The combination of the coupling shaft and the coupling-transmission device with the transmission groups of the group transmission gear creates the prerequisite so that the gear pairs of the group transmission gear itself can be used so as to attain a particularly high reduction and thus a creeper speed—for example, with a speed of 150 meters/hour. Separate reduction stages for the implementation of a creeper speed are thus avoided. Rather, the gear pairs, which are, in any case, present for the group transmission gear, can contribute, in an additional function, to the implementation of the creeper gear. In this way, the group transmission gear can be designed, for a creeper speed function, at a low cost and in a space-saving manner with a few additional components. The creeper speed function is, consequently, made available with the least possible changes to the gear arrangement of the individual vehicle. The creeper speed can then, if needed, be simply activated by the control of the coupling-transmission device.

The reduction made available on the output shaft by means of the creeper speed can vary as a function of the arrangement of the coupling shaft and the coupling-transmission device or its interaction with specific gear pairs of individual transmission groups. This can also bring about different power flow directions within the group transmission gear in the direction of the output shaft. In this way, it is possible to adapt the creeper speed function with little effort to different demands of agricultural vehicles and different customer wishes.

As was already mentioned, the coupling shaft is connected with respect to the drive, via the coupling-transmission device, in the coupling-transmission position, with a gear pair of a transmission group, and in the decoupling-transmission position, this drive connection is again interrupted. The coupling-transmission device can be either directly connected with the gear pair of the group transmission gear (for example, directly with a gear of the gear pair itself) or indirectly by means of additional power flow-transferring components (for example, by means of one or more additional gears, which are drive-connected with the gear pair in a suitable manner, or they are firmly connected so they cannot rotate.

The drive connection of the coupling shaft with a gear pair of a transmission group in the coupling-transmission position of the coupling-transmission device also comprises the possibility of the power flow being guided, for example, to an adjacent gear pair, merely via a gear of the aforementioned drive-connected gear pair. Therefore, this drive-connected gear pair need not inevitably conduct the power flow via all its gears.

In one embodiment, the coupling-transmission device is in the coupling-transmission position and consequently, along with the coupling shaft, via a coupling-gear, are drive-connected with the aforementioned gear pair, in order to make available a correspondingly changed rpm according to an activated creeper speed function in the output shaft.

For example, the coupling-gear is coaxially (rotatably or non-rotatably) arranged on the output shaft and designed as an inevitably present gear pair of a transmission group of the group transmission gear. Thus, the drive connection in the coupling-transmission position is attained in a particularly space-saving manner, without additional components.

Alternatively, the coupling-gear is arranged as an additional component meshing with a gear pair and, in this way, can additionally influence the reduction as a function of its dimension. In particular, this coupling gear, as a front gear, radially meshes with the gear pair of a transmission group.

In another embodiment, the coupling gear is operatively connected with an adjacent gear in order to pass on the power flow. This adjacent gear is coaxially arranged next to a gear of a gear pair of a transmission group and it is non-rotatably connected with this gear of the gear pair. In this manner, the coupling-gear and the adjacent gear form, in turn, a kind of gear pair, which can adjust or change, as a function of the dimensioning, the desired reduction.

The interaction of the coupling-gear with the adjacent gear can take place in various ways. They can form a gear set and with parallel rotating axles, as front gears, they radially mesh with one another. In another embodiment, the two gears can be operatively connected with one another via a pulling means (for example, a toothed belt or a chain for the implementing of a toothed belt drive or a chain drive). The pulling means allows an even greater flexibility with the arrangement and the dimensioning of the gears, if a defined reduction is to be attained.

In one embodiment, the coupling shaft has a shaft section that is non-rotatably connected with a shaft-gear. This shaft section is arranged along the power flow direction or along the axial direction of the coupling shaft, next to the coupling-transmission device, at a distance from or facing away from the coupling-transmission device. This arrangement supports an efficient transfer of the power flow from the affected gear pair or gear pairs to the output shaft.

For example, the shaft-gear is coaxially (rotatably or non-rotatably) arranged on the output shaft and is designed as a gear of an inevitably present gear pair of a transmission group of the group transmission gear. In this way, additional components for the operative connection between the coupling shaft and a gear pair of the group transmission gear are avoided. Furthermore, in spite of the presence of the coupling shaft, the power flow can be conducted to the output shaft in a particularly space-saving manner.

Alternatively, the shaft-gear is arranged in a meshing manner as an additional component with a gear pair of the group transmission gear and can thus additionally influence the reduction, as a function of its dimensioning. In particular, as a front gear, this shaft-gear radially meshes with the gear pair of a transmission group.

In another embodiment, the shaft-gear is operatively connected with an adjacent gear to pass on the power flow. This adjacent gear is coaxially arranged next to a gear of a gear pair of a transmission group and it is non-rotatably connected with this gear of the gear pair. In this way, the shaft-gear and the adjacent gear (analogous to the already mentioned coupling-gear and another adjacent gear) form, in turn, a kind of gear pair, which can adjust or change the desired reduction as a function of the dimensioning.

The interaction of the shaft-gear with the correlated adjacent gear can be carried out in different ways. They can form a gear set and with parallel rotating axles as front gears, radially mesh with one another. In another embodiment, the two gears have a pulling means (for example, a toothed belt or a chain for the implementation of a toothed belt drive or a chain drive) can be operatively connected with one another. The pulling means allows an even greater flexibility with the arrangement and dimensioning of the gears if a defined reduction is to be attained.

The coupling shaft and the coupling-transmission device can be arranged, according to the power flow, between two gear pairs of the group transmission gear. In particular, this arrangement is provided, according to the power flow, between the aforementioned coupling-gears and one of the aforementioned coupling-gears and one of the aforementioned shaft-gears.

In another embodiment, the coupling shaft is superordinate or upstream from the transmission groups of the group transmission gear. A shaft section of the coupling haft, turned away, according to the power flow, from the coupling-shaft device, may not connected non-rotatably with a shaft-gear. Rather, there is the possibility here of bringing this shaft section into a drive connection with a gear arrangement or gear unit upstream from the group transmission gear. The coupling shaft can then be driven at an input rpm that is made available by the upstream gear arrangement or gear unit. The power flow can thus be driven to the output shaft by the coupling shaft and the coupling transmission device in the coupling-transmission position in the form of an environment (bypass). In this creeper speed function, the outlay for additional components remains low.

In one embodiment, the coupling shaft is designed as a hollow shaft. This supports a space-saving enabling of the creeper function, especially if this coupling shaft is arranged coaxial to the output shaft.

An especially space-saving arrangement of the creeper speed function with as low as possible a number of additional components is then attained, if the coupling shaft, designed as a hollow shaft, is arranged coaxial to the output shaft, and with its shaft section, turned away from the coupling-transmission device, according to the power flow, is connected non-rotatably with a gear of a gear pair of a transmission group.

In another embodiment, the group transmission gear has two input shafts. In particular, on the two input shafts, a gear of at least one gear pair of the transmission groups is arranged coaxially (rotatable or non-rotatable). The two input shafts create the prerequisite for the group transmission gear being adaptable with one or more (in particular, two) outputs of the most different of the upstream gear types or gear arrangements. Traditional, complex construction changes of the group transmission gear become invalid hereby for the adaptation to different upstream basic gears.

In the case of two input shafts, one of the input shafts of the group transmission gear can be designed as a hollow shaft and is arranged coaxial to the first input shaft. This supports a space-saving structure of the group transmission gear.

On the basis of its two inputs, two different rpms can be made available for the group transmission gear, so that the individual transmission groups—by making available a suitable control or wiring for the transmission groups or their gear pairs—can be driven alternately with the rpm of the first input shaft or with the rpm of the second input shaft. In this way, the total spectrum of the rpm of the input shaft is subdivided in a very finely graduated manner. For example, the gradation of the speeds and courses with a basic gear with one output and downstream group gear are doubled merely through two inputs of the group transmission gear. Independent of this, with all upstream basic gears, a finer gradation is created, corresponding to the number of the used transmission groups. Thus, for example, with a four-speed basic gear, with one output and one downstream group transmission gear with three transmission groups, a division with 24 (4×2×3) gear steps can be created, By providing the explained creeper speed function, the number of the possible speed stages is increased (is doubled).

Viewed as a whole, the group transmission gear is able to attain fine gradations without special additional outlay.

The group transmission gear has several (in particular, three) transmission groups. Each of these transmission groups may cover a different rpm range on the group output shaft.

For example, for a vehicle designed as a tractor, the group transmission gear offers several work ranges, according to the number of the transmission groups. In particular, three transmission groups are provided for three work ranges. A first work range, "field work" for example, can be designed on the field for applications involving more difficult jobs, wherein mostly difficult pulling jobs are to be carried out in a low speed range (for example, between 2 and 11 km/h). A second work range, "power take-off operation" for example, can be designed for applications for easier pulling tasks on the field, using a power take-off drive, wherein a medium speed range (for example, between 4.5 and 18 km/h) may be selected or used. A third work range, "transport" for example, can be designed for pure transport tasks, with a higher speed range of, for example, 14 km/h to the highest speed. With the aid of the two input shafts described above, which provide different rpms, the work ranges can be coordinated so finely that a constant course of the efficiency or the power loss of the gear arrangement is supported over the entire spectrum of the rpm or the travelling speed of the vehicle. This, in turn, facilitates the implementation of optimized gear automatisms, especially with regard to the use of travelling strategies for reduced fuel consumption.

The individual transmission groups have at least one gear pair and each gear pair contains a gear arranged coaxially on an input shaft. In some embodiments, at least one of these gears is non-rotatably connected with the first input shaft or with the second input shaft and is then brought into a drive connection with the other input shaft by means of this transmission device. In this way, a technically simple and low-cost construction guarantees the provision of two different rpms for a transmission group, according to a defined transmission strategy. Moreover, this transmission device also allows the preliminary placement or pre-selection of the next speed stage, so that any interruption of the drive connection between the pertinent input and the group output shaft of the group transmission gear during the switching between the speed stages is avoided. Thus, the group transmission gear supports an interruption-free load switching during the transmission operation.

The term "switch device," in particular, "coupling-switch device," should be understood, here and below, in particular in the claims, to be representative for devices or components with which gears or gear pairs can be controlled or connected. For example, as switch devices, it is possible to use synchronization devices, couplings (for example, multi-plate coupling, claw coupling) or braking devices (for example, for the blocking of a hollow wheel or a planetary gear).

In one embodiment, the first input shaft and the second input shaft are non-rotatably connected with at least one of the coaxial gears described above. In this way, the transmission groups are distributed on the two input shafts. This distribution supports a compact, axially short structure of the group transmission gear.

A gear of a transmission group can be connected non-rotatably with an input shaft, whereas a gear of a following transmission group (in the direction of a higher or lower rpm on the output shaft) is non-rotatably connected with the other input shaft. This arrangement supports a simple gear construction of an interruption-free load switching on the output shaft. For example, with a corresponding control or switching of the gear pairs on the output shaft, it is possible—in the case of an intended change of the transmission group—to preselect or to carry out a preliminary placing of the next speed stage on the output shaft before this next speed change is brought into an operative connection with one of the two input shafts—in particular by switching the aforementioned transmission device.

In another embodiment, at least one transmission group has two gear pairs, wherein the gear of the one gear pair, which is arranged coaxially on the first input shaft, is non-rotatably connected with this first input shaft, and the gear of the other gear pair, which is arranged coaxially on the other input shaft is non-rotatably connected with this second input shaft. In this way, a transmission strategy can omit, within the same transmission group, the control of switch devices between the two input shafts. The reduction ratio of these two gear pairs of the same transmission group can be identical or, alternatively, be slightly different, if this leads to an improved speed distribution.

A switch device on the output shaft can be arranged axially between gears of two transmission groups, supported non-rotatably on the output shaft. Independent of an axial transmission position, this switch device can bring one of the two transmission groups or its gear pair into a drive connection with the output shaft. In particular, a switch device is provided between all successive transmission groups. A switch device arranged in such a manner allows, in a switching operation, a preselection or preliminary placing of the next speed stage or transmission group, so that a load switching to the next speed stage or transmission group can be implemented without interruption of the drive connection between an input of the group transmission gear and its output shaft.

This/these switch device(s) on the output shaft—as well as perhaps on the two aforementioned input shafts—allow, in combination with the coupling shaft in a coupling-transmission position, a large number of variously changed rpm, which (dependent on the control of the individual switch devices) can be made available on the output shaft for the creeper speed function.

The output shaft can be designed as a differential-drive shaft and, for example, drives a wheel axle of a vehicle for the implementation of a front wheel drive or a rear wheel drive.

In one embodiment, the already mentioned basic gear can have two outputs, which in the case of a group manual transmission with two input shafts are each correlated with one input shaft. One output is hereby drive-connected with an input shaft of the group manual transmission, whereas the other output is drive-connected with the second input shaft of the group manual transmission. At least one of the two drive connections can be designed as a direct drive shaft with an unchanged rpm. This direct drive shaft is, in particular, designed as a non-rotatable connection.

In another embodiment, the basic gear of the gear arrangement has merely one output. This can, alternatively, be brought into a drive connection with one of the two input shafts of the group manual transmission, wherein the number of the speed stages of the basic gear is doubled and thus a finer gradation of the gear arrangement is attained.

The drive connection between the single output of the basic gear and an input shaft of the group manual transmission can be a direct drive shaft with an unchanged rpm. The drive connection between the output of the basic gear and a second input shaft the group manual transmission can contain a gear device, wherein the rpm of the basic gear output is changed in a defined manner and can be made available, either reduced or increased, on the second input shaft of the group manual transmission. In this way, in a technically simple manner, a minimum and/or maximum output rpm can be varied on the group output shaft. A replacement of individual gears or gear pairs in the group manual transmission is not needed for this. This also increases a simple compatibility of the group manual transmission in different gear arrangements. Also, with the aforementioned variation of the output rpm, different technical demands on the individual vehicle, different customer demands, and also different national legal demands can be met, at low cost, with the same switch groups or gear pairs.

To meet various demands, especially in connection with a variation of a minimum and/or maximum output rpm on the output shaft, it may be reasonable to change individual gear pairs of a group manual transmission, or all of them, merely with regard to their axial arrangement relative to the two input shafts.

The gear device for the drive connection between an output of the basic gear and the second input shaft of the group manual transmission can be designed in different ways. The following, for example, are available at low cost and can be integrated with little installation effort: gear pairs (front wheel gears), planetary gears, or planetary gears with two axially staggered sun wheels.

For the support of the building block-like, modular, and thus installation-friendly structure of the entire gear arrangement, the gear device between the output of the basic gear and the second input shaft of the group manual transmission can be a component of a gear unit that is connected, in the power flow direction, between the basic gear and the group manual transmission.

As already mentioned, in one embodiment, an output of the basic gear can be brought in a drive connection with an input wave of two input waves of the group manual transmission. For this purpose, at least one switch device may be provided. This switch device can be designed, for example, as a coupling device for the closing and interrupting of a power flow connection. For example, two such switch devices can be provided, wherein one switch device is arranged between an output of the basic gear and an input shaft of the group transmission gear, whereas the other switch device is arranged between the same basic gear output and the second input shaft of the group manual transmission. By a suitable, in particular, simultaneous, control of these two switch devices, it is possible to interrupt the power flow connection between an output of the basic gear and an input shaft and, at the same time, to close the power flow connection between the same basic gear output and the second input shaft of the group manual transmission. By the corresponding control of these switch devices, the individual power flow connection can accept the reverse state—that is, interrupted instead of closed and closed instead of interrupted.

BRIEF DESCRIPTION OF THE DRAWINGS

The disclosure is explained in more detail, below, with the aid of the appended drawings. Components that coincide or are comparable with regard to their function are thereby marked with the same reference symbols. The figures show the following:

FIG. 1a, a gear scheme of a group manual transmission according to the disclosure in a first embodiment;

FIG. 1b, the gear scheme according to FIG. 1a with a depicted power flow course;

FIG. 1c, the gear scheme according to FIG. 1a with another depicted power flow course;

FIG. 3a, a gear scheme of a group manual transmission according to the disclosure in another embodiment;

FIG. 3b, the gear scheme according to FIG. 3a with a depicted power flow course;

FIG. 3c, the gear scheme according to FIG. 3a with another depicted power flow course;

FIG. 5, a gear scheme of a group manual transmission according to the disclosure in another embodiment;

FIG. 6, a gear scheme of a group manual transmission according to the disclosure in another embodiment;

FIG. 7, a gear scheme of a group manual transmission according to the disclosure in another embodiment;

DETAILED DESCRIPTION

Figures 2A, 2B, 2C:
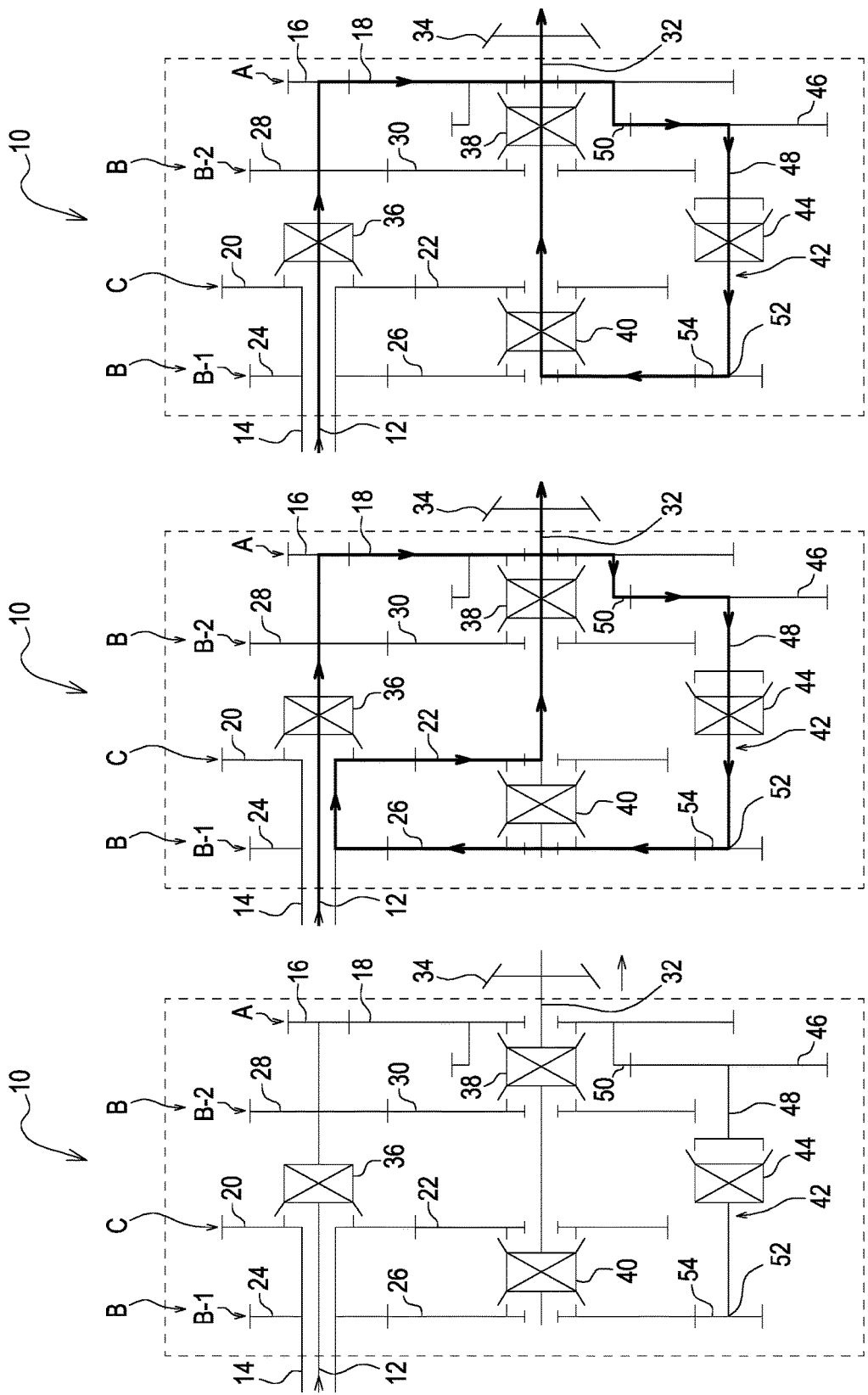
FIG. 2a, a gear scheme of a group manual transmission according to the disclosure in another embodiment.
FIG. 2b, the gear scheme according to FIG. 2a with a depicted power flow course.
FIG. 2c, the gear scheme according to FIG. 2a with another depicted power flow course.

The schematic structure of a group manual transmission 10 according to the disclosure is explained with the aid of FIG. 1a. The group manual transmission 10 contains two inputs for the purpose in the form of a first input shaft 12 and a second input shaft 14, which has the form of a hollow shaft and is arranged coaxially and such that it can rotate. Three switch groups A, B, and C are provided, wherein, in another embodiment, another number (at least two) of switch groups can be provided. The switch group A has a gear pair with meshing gears 16 and 18. The switch group C has a gear pair with meshing gears 20 and 22. The switch group B has a first gear pair B-1 with meshing gears 24, 26, and a second gear pair B-2 with meshing gears 28, 30. The transmission ratios of the two gear pairs B-1 and B-2 can be dimensioned identical or approximately identical.

Depending on the control which has yet to be described, either the first input shaft 12 or the second input shaft 14 can be brought into a drive connection with an output shaft 32 via a gear pair of a switch group A, B, C. The output shaft 32, which is arranged parallel to the input shafts 12, 14, has a cone gear 34 on its output axial end as a drive gear for another gear. The output shaft 32 can be designed as a differential drive shaft for the drive of a wheel axle of a vehicle.

The gears 16, 20, 24, 28 of the gear pairs A, B-1, B-2, C are coaxially arranged with respect to the first input shaft 12 and the second input shaft 14. In the embodiment according to FIG. 1a, the gears 16, 28 of the gear pairs A, B-2 are non-rotatably connected with the first input shaft 12, whereas the gears 20, 24 of the gear pairs C, B-1 are non-rotatably connected with the second input shaft 14.

On the first input shaft 12, an axially displaceable switch device 36 (for example, a synchronizing device) is non-rotatably connected. By a corresponding control of this switch device 36, the gears 16, 28, non-rotatably connected with the first input shaft 12, can be brought into a drive connection with the second input shaft 14, and the gears 20, 44, which are non-rotatably connected with the second input shaft 14, can be brought into a drive connection with the first input shaft 12.

Proceeding from the switch group A, the gears of the gear pairs, arranged coaxially on the first input shaft 12, have an increasing diameter, wherein the two gears 24, 28 of the same switch group B are dimensioned with an identical or approximately identical diameter. Proceeding from the switch group A, the gears of the aforementioned gear pairs, which are coaxially arranged on the output shaft 32, have a smaller diameter, wherein the two gears 26, 30 of the same switch group B are dimensioned with an identical or approximately identical diameter. With such a dimensioning of the gear pairs, it is, for example, possible for a correlation of the switch groups to be carried out with respect to the already described work ranges of an agricultural vehicle, wherein the switch group A corresponds to the first work range "field work," the switch group B, to the second work range "PTO operation," and the switch group C, to the third work range "transport."

Two axially displaceable switch devices 38, 40 (for example, synchronizing devices) are non-rotatably arranged on the output shaft 32. The switch device 38 is arranged axially between the switch group A and the gear pair B-2 of the switch group B and, as a function of an axial switching position, either the gear pair of the switch group A or the gear pair B-2 of the switch group B can be brought into a drive connection with the output shaft 32. The switch device 40, on the other hand, is axially arranged between the switch group C and the gear pair B-1 of the switch group B and, as a function of an axial switching position, either the gear pair of the switch group C or the gear pair B-1 of the switch group B can be brought into a drive connection with the output shaft 32.

Proceeding from such a structure, the group transmission gear 10 can be expanded with a creeper speed function with a small amount of effort, essentially only with a few additional components.

For this purpose, the group manual transmission 10 has a coupling shaft 42, which is non-rotatably connected with a coupling-switch device 44. The coupling-switch device 44 can accept at least two different switching positions. In a coupling-switching position, according to FIG. 1b and FIG. 1c, the coupling-switch device 44, and consequently also the coupling shaft 42 are indirectly (that is, via components which are yet to be explained), drive-connected with the gear pair 16, 18 of the switch group A. In an interruption-switching position according to FIG. 1a, this drive-connection between the coupling shaft 42 and the gear pair 16, 18 is interrupted.

For a direct or indirect drive-connection between the coupling shaft 42 and a gear pair of the group manual transmission 10 in the coupling-switching position of the coupling-switch device 44, various embodiments are possible.

According to FIG. 1b and FIG. 1c, the coupling shaft 42 in the coupling-switching position is indirectly drive-connected with the gear pair 16-18 via a coupling-gear 46. The coupling-gear 46, according to FIG. 1a, FIG. 1b, FIG. 1c, carries a shaft extension 48, which is arranged, coaxially and non-rotatably, on the coupling-gear 46. This shaft extension 48 is drive-connected with the coupling shaft 42 in the coupling-switching position according to FIG. 1b and FIG. 1c. In FIG. 1a, FIG. 1b, FIG. 1c, the coupling-gear 46 is operatively connected with an adjacent gear 50. The adjacent gear 50 is coaxially arranged next to the gear 18 of the gear pair 16, 18 of the switch group A and non-rotatably connected with this gear 18. Designed as front gears, the coupling-gear 46 and the adjacent gear 50 radially mesh with one another. In this way, the coupling shaft 42 in the coupling-switching position of the coupling-switch device 44 is indirectly drive-connected with the gear pair 16, 18.

According to FIG. 1a, axially outside the coupling-switch device 44, the coupling shaft 42 has a shaft section 52, which is non-rotatably connected with a shaft-gear 54. The shaft-gear 54 is arranged here, in a radially meshing manner, with the gear 22 of the gear pair 20, 22 of the switch group C.

FIG. 1b and FIG. 1c, for example, show how, as a function of the switching positions of the switch devices 38, 40 with an applied creeper speed (that is, in a coupling-switching position of the coupling-switch device 44), various gear-down speeds can be made available on the output shaft 32. With the aid of the arrows in FIG. 1b and FIG. 1c, the direction course of the power flow is shown. In FIG. 1b, proceeding from the input rpm pending on the first input shaft 12, the power flow takes place via the switch group A, the adjacent gear 50, the coupling-gear 46, the shaft extension 48, the coupling shaft 42, the shaft-gear 54, and the gear 22, to the output shaft 32. In FIG. 1c, on the other hand, proceeding from the input rpm pending on the first input shaft 12, the power flow takes place via the switch group A, the adjacent gear 50, the coupling gear 46, the shaft extension 48, the coupling shaft 42, the shaft-gear 54, the gear pair 22, 20, the second input shaft 14, the gear pair 24, 26, to the output shaft 32.

The group manual transmission 10 according to FIG. 2a essentially differs from the embodiment according to FIG. 1a in that the shaft-gear 54 has a smaller diameter and is arranged, in a meshing manner, with the gear 26 of the gear pair 24, 26 or B-1 of the switch group B. Accordingly, the coupling shaft 42 is dimensioned longer axially. In this variant, in a corresponding switching position of the switch device 40 (FIG. 2b), there is the possibility that proceeding from the input rpm pending on the first input shaft 12, the power flow takes place via the switch group A, the adjacent gear 50, the coupling-gear 46, the shaft extension 48, the coupling shaft 42, the shaft-gear 54, the gear wheel pair 26, 24, the second input shaft 14, the gear pair 20, 22, to the output shaft 32. In another switching position of the switch device 40 (FIG. 2c), proceeding from the input rpm pending on the first input shaft 12, the power flow takes place via the switch group A, the adjacent gear 50, the coupling-gear 46, the shaft extension 48, the coupling shaft 42, the shaft-gear 54, and the gear 26, to the output shaft 32.

The group manual transmission 10 according to FIG. 3a essentially differs from the embodiment according to FIG. 1a in that the adjacent gear 50 is non-rotatably connected with the gear 30 of the gear pair 28, 30 or B-2. The adjacent gear 50 thereby meshes, once again, with the coupling-gear 46. In this variant, in a corresponding switching position 40 (FIG. 3b), there is the possibility that proceeding from the input rpm pending on the first input shaft 12, the power flow takes place via the gear pair 28, 30 of the switch group B, the adjacent gear 50, the coupling-gear 46, the coupling shaft 42, the shaft-gear 54, the gear 22, to the output shaft 32. In another switching position of the switch device 40 (FIG. 3c), proceeding from the input rpm pending on the first input shaft 12, the power flow takes place via the gear pair

28, 30 or B-2 of the switch group B, the adjacent gear 50, the coupling-gear 46, the coupling shaft 42, the shaft-gear 54, the gear pair 22, 20, the second input shaft 14, the gear pair 24, 26 or B-1 of the switch group B, to the output shaft 32.

Figure 4A:
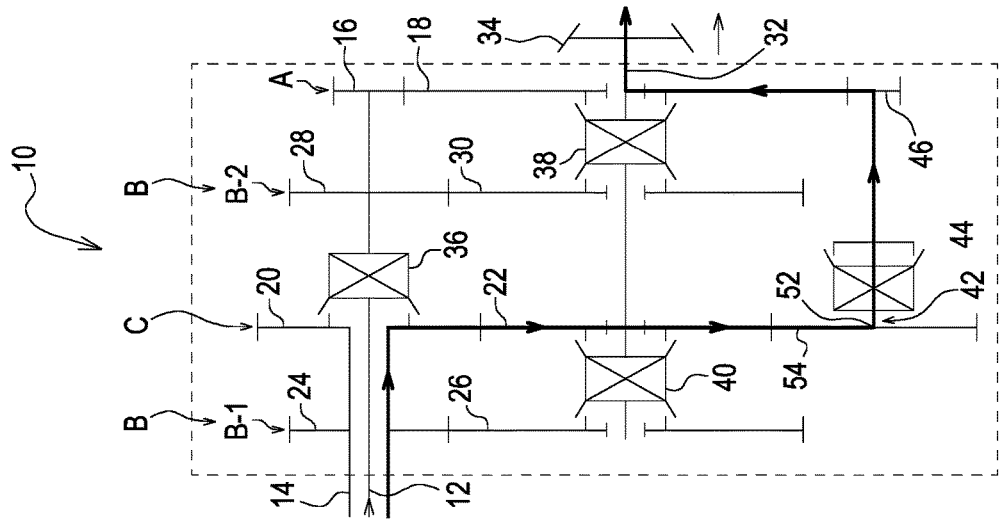
FIG. 4a, a gear scheme of a group manual transmission according to the disclosure in another embodiment.

The group manual transmission 10 according to FIG. 4*a* differs from the embodiment according to FIG. 1*a* in that an adjacent gear 50 is not provided. Rather, the coupling-gear 46 is arranged to mesh with the gear 18 of the gear pair 16, 18 of the switch group A. The diameter of the coupling-gear 46 is smaller in comparison to the variant in FIG. 1*a*. On the other hand, the shaft-gear 54 has a larger diameter in comparison to the variant in FIG. 1*a*.

Figure 4B:
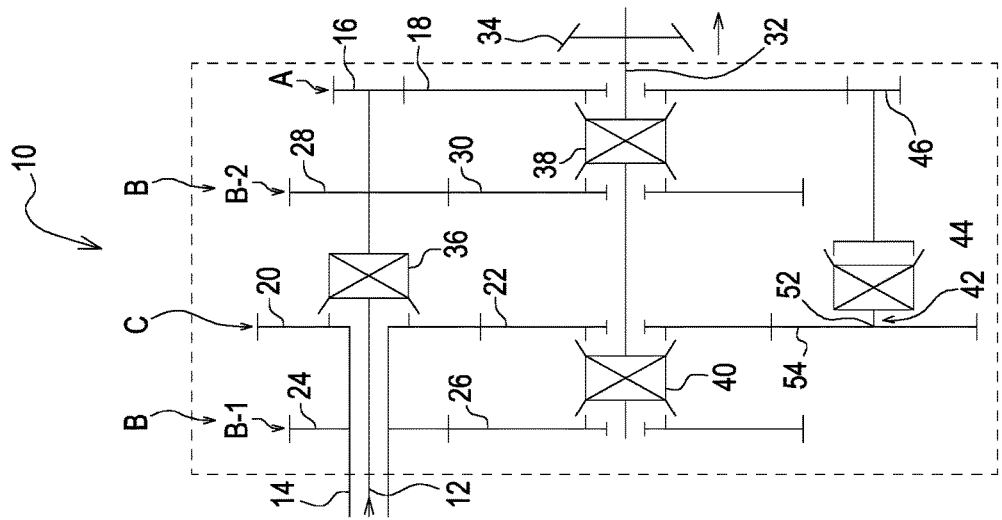
FIG. 4b, the gear scheme according to FIG. 4a with a depicted power flow course.

In a control of the switch device 38 according to FIG. 4*b*, proceeding from the input rpm pending on the second input shaft 14, the power flow takes place via the gear pair 20, 22 of the switch group C, the shaft-gear 54, the coupling shaft 42, the shaft extension 48, the coupling-gear 46, the gear 18, to the output shaft 32.

In connection with FIG. 4*a*, it should be noted that with the other depicted variants also, the power flow—depending on the selected control—can basically flow from the second input shaft 14 to the output shaft 32, if two output shafts are present. In addition, also via the control of the switch device 36, the power flow can be conducted by means of different switch groups or different gear pairs of the group manual transmission 10. These possibilities create an even greater flexibility in the change of an input rpm pending on the group manual transmission 10. The output rpm range, which can be covered with the group manual transmission 10, can be significantly expanded in this way.

In the embodiments according to FIG. 5 and FIG. 6, the coupling-gear 46 and the shaft-gear 54 are, in each case, a component of a chain drive within the group manual transmission 10. FIG. 5 shows an embodiment of the group manual transmission 10, which, among other things, differs from the variant according to FIG. 1*a* in that the coupling-gear 46 and the adjacent gear 50, non-rotatably connected with the gear 18, are operatively connected with one another by means of a chain 56. Also, the shaft-gear 54 is, in FIG. 5, a component of a chain drive in that it is operatively connected, via a chain 58, with an adjacent gear 60. This adjacent gear 60 is coaxially arranged next to the gear 22 of the gear pair 20, 22 and is thereby non-rotatably connected with the gear 22.

In the variant according to FIG. 6, the chain drive is arranged, axially displaced, with the shaft-gear 54 and the adjacent gear 60, in comparison to FIG. 5, in that the adjacent gear 60 is coaxially arranged next to the gear 26 of the gear pair 24, 26 and is thereby non-rotatably connected with the gear 26.

The embodiment according to FIG. 7 differs from the variant according to FIG. 1*a* in that the coupling-gear 46 and the adjacent gear 50, operatively connected in a meshing manner with it, are arranged axially displaced in comparison to FIG. 1*a*, in that the adjacent gear 50 is coaxially arranged next to the gear 30 of the gear pair 28, 30 and is thereby non-rotatably connected with the gear 30.

Figure 8A:
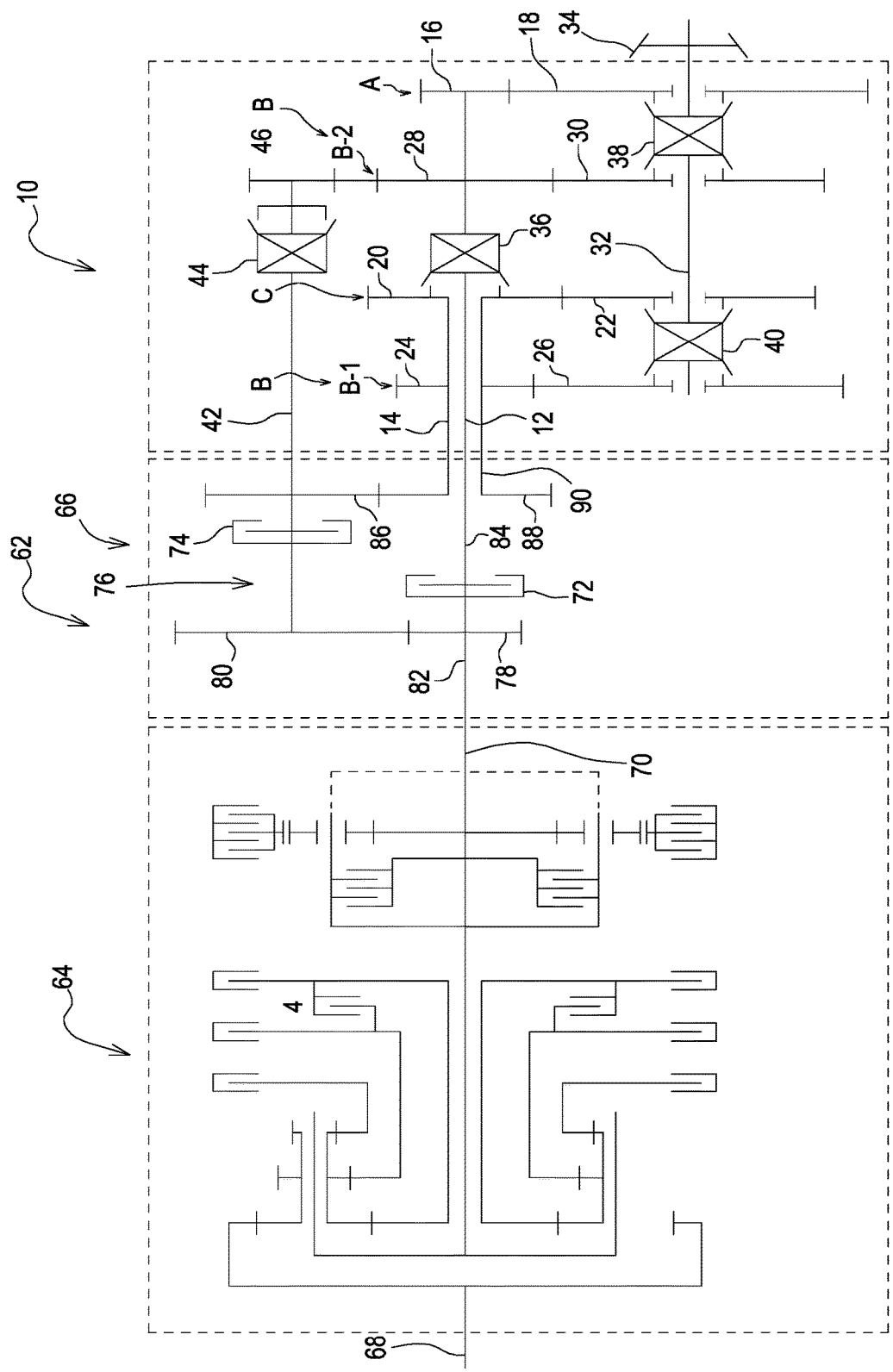
FIG. 8a, a gear scheme of a gear arrangement with a basic gear, of another embodiment of a group manual transmission according to the disclosure, and a gear unit, connected between a basic gear and a group manual transmission.
Figure 8B:
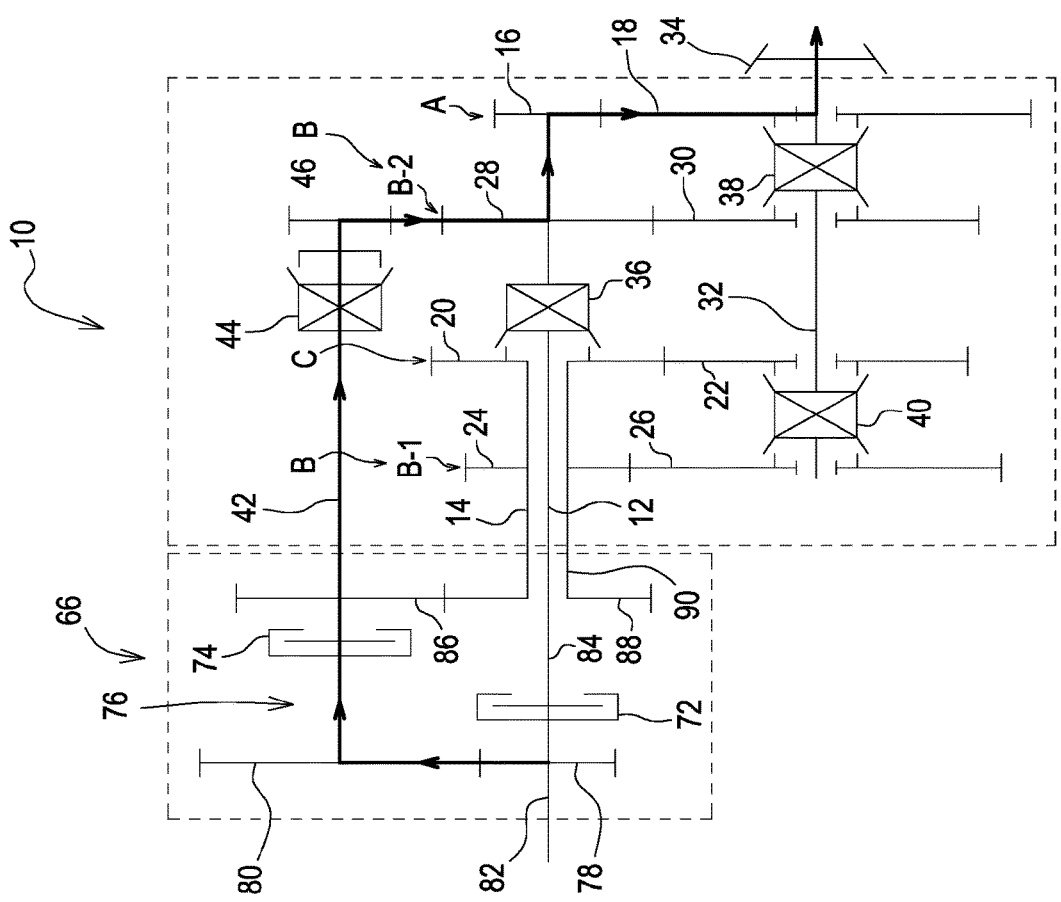
FIG. 8b, the gear scheme according to FIG. 8a, but without a basic gear, with a depicted power flow course.

In the embodiment according to FIG. 8*a*, the group manual transmission 10 does not need a shaft-gear 54 for the non-rotatable connection with the coupling shaft 42. Rather, for conducting the power flow via the coupling shaft 42, the only thing needed is a coupling-gear 46, which can be dimensioned with a different diameter and which is arranged such that it meshes with the gear pair 28, 30 or the B-2 of the switch group B. This is alluded to with the dotted line in the radial direction between the coupling-gear 46 and the gear 28. With this constellation, on the side on the coupling shaft 42, there is an input rpm which can be conducted, in the coupling-switching position of the coupling-switch 44, and a corresponding control of the switch device 38 (FIG. 8*b*) as a reduction, which is changed in the manner of a circumvention (bypass) with respect to the output shaft 32. The power flow thereby takes place via the coupling shaft 42, the coupling-gear 46, the gear 28, and the gear pair 16, 28, to the output shaft 32 (FIG. 8*b*).

This power flow principle of an input-side coupling shaft 42 can, of course, also be changed in that with a corresponding demand, the coupling-gear 46 is axially displaced and is arranged such that it meshes with another gear pair of the group manual transmission 10. As was already mentioned in connection with the other embodiments, it is also possible to attain a large number of differently changed output rpm on the output shaft with the group manual transmission according to FIG. 8*a* with a corresponding control of the switch devices 36, 38, 40, wherein the usage range of a corresponding automatic mode is further increased.

Moreover, for example, in FIG. 8*a*, a gear arrangement 62 is schematically depicted. The gear arrangement 62 has a basic gear 64, a gear unit 66, and a group manual transmission 10. Of course, the other depicted embodiments of the group manual transmission 10 with their two input shafts 12, 14 of such a gear unit 66 can also be downstream. The group manual transmission 10 is downstream from the basic gear 64 and the gear unit 66. The gear unit 66 is therefore interposed between the basic gear 64 and the group manual transmission 10.

The basic gear 64 can be an arbitrary gear with an input shaft 68 and a single output in the form of an output shaft 70. It is designed, for example, as a traditional 4-speed gear. Its structure and mode of functioning are generally known and are therefore not described in detail here. The rpm of a combustion engine of a vehicle is made available on the input shaft 68. The output shaft 70 is brought into a drive-connection with the group manual transmission 10 in a manner which has yet to be described.

The output shaft 70 of the basic gear 12 according to FIG. 1 is, alternatively, brought into a drive connection with the first input shaft 12 or with the second input shaft 14 of the group manual transmission 10. For this purpose, the gear unit 66 has a first coupling device 72, a second coupling device 74, and a gear device 76. The gear device 76 contains two gear pairs. A gear pair consists of meshing gears 78, 80. The gear 78 is non-rotatably arranged on an input shaft 82 of the gear unit 66. This input shaft 82 is non-rotatably connected with the output shaft 70 of the basic gear 64. The input shaft 82 is coupled with a first output shaft 84 of the gear unit 66 via the first coupling device 72. The first output shaft 84 is, in turn, non-rotatably connected with the first input shaft 12. In this way, a direct drive connection is set up between the output shaft 70 of the basic gear 64 and the input shaft 12, which, as a function of the control of the first coupling device 72, is closed or interrupted.

With a corresponding control, the second coupling device 74 of the gear unit 66 is able to interrupt a power flow within the gear device 76—more accurately stated, between the two gear pairs of this gear device 76. The gear pair of the gear device 56, axially opposite the gears 78, 80, consists of meshing gears 86, 88. The gear 88 is non-rotatably connected with a second output shaft 90 of the gear unit 66. This second output shaft 90 is arranged coaxially and such that it can be rotated with respect to the output shaft 84; it is designed as a hollow shaft and is non-rotatably connected with the second input shaft 14 of the group manual transmission 10.

With a corresponding control or switching of the first coupling device 52, there is a direct transmission from the output shaft 70 of the basic gear 64 to the first input shaft 12 of the group manual transmission 10. Then the rpm of the output shaft 70 is made available unchanged on the input shaft 12. The gears 78, 80, 86, 88 of the gear device 76 are dimensioned in such a way that the rpm of the output shaft 70 is made available in reduced form on the second input shaft 14 of the group manual transmission 10 if the second coupling device 74 is correspondingly controlled or switched. Therefore, there is a smaller rpm available on the second input shaft 14 than on the first input shaft 12.

By a corresponding control or switching of the switch devices 36, 38, 40 and the coupling device 72, 74, the two speed stages (higher rpm on the first input shaft 12 and lower rpm on the second input shaft 14) can be changed within a switch group A or B or C. Likewise, a switching between the individual switch groups A, B, C can take place by means of the switch devices 36, 38, 40 and the coupling devices 72, 74. In particular, the switch devices 36, 38, 40 allow, on the output shaft 32, a preliminary placing or a preselection of the next speed stage, so that switching between individual speed stages, an interruption of the drive connection between the input (the first input shaft 12 or the second input shaft 14) and the output shaft 32 of the group manual transmission 10 is avoided. After the preliminary placing or preselection of the next speed stage, the coupling devices 72, 74 are correspondingly controlled so as to make available the rpm corresponding to the next speed stage on the input of the group manual transmission 10 without interruption of the drive connection.

For example, the second input shaft 14 is in a drive connection with the output shaft 32 of the group manual transmission 10 via the gear pair B-1—that is, via the gears 24, 26. It is to be switched into the next speed stage (gear pair B-2, gears 28, 30). This next gear stage is preselected or preliminarily placed in that the switch device 38 is controlled in such a manner that the gear 30 or the gear pair B-2 is in a drive connection with the output shaft 32. Subsequently, a simultaneous switching of the two coupling devices 72, 74 is sufficient to attain the next speed stage, and the gear pair B-2 is thereby driven with the rpm of the first input shaft 12.

Afterwards, for example, a further switching into the switch group C is to be carried out, wherein the lower rpm (second input shaft 14) is to be effective on the switch group C. This speed stage is, in turn, first preselected or preliminarily placed in that the switch device 40 is controlled in such a way that the gear 22 or the gear pair C is in a drive connection with the output shaft 32. Subsequently, a simultaneous switching of the two coupling devices 72, 74 is sufficient, so that the preselected speed stage is attained and the gear pair C is driven with the rpm of the second input shaft 14.

Subsequently, for example, a further switching is carried out within the switch group C—that is, the higher rpm (first input shaft 12) should be effective on the switch group C. This speed stage is, in turn, first preselected or preliminarily placed in that the switch device 36 is controlled in such a way that the gear 20 or the gear pair C is in a drive connection with the first input shaft 12. Then, a simultaneous switching of the two coupling devices 72, 74 is sufficient so that the preselected speed stage is attained and the gear pair C is driven with the rpm of the first input shaft 12.

Alternatively, the development of the gear device 76 according to 8a is modified in such a way that it changes the rpm pending on the first input shaft 12 to a higher rpm, and makes it available in this increased form to the second input shaft 14. For this purpose, only the meshing gears 78, 80 and 86, 88 have to be dimensioned correspondingly different. Alternatively, with a saving of costs, individual gears 78, 80, 86, 88 can also be reused merely in another series within the gear device 76 in order to make available the higher rpm on the second input shaft 14. Individual switch groups can also be hereby axially displaced with regard to their arrangement on the first or second input shaft 12, 14. Thus, for example, the gear pairs A and B-2 are again non-rotatably connected with the input on which the comparatively higher rpm is made available. Likewise, the gear pairs B-1 and C can be, again, non-rotatably connected with the input on which the comparatively lower rpm is made available. By a corresponding control of the coupling devices 72, 74, it is then again possible for the group manual transmission 10—apart from the changed rpms—to attain, in principle, the same switching functionality as described.

In other embodiments, which are not depicted here, the gear device 76 can be set up, at least in part, with other components for the gear unit 66 according to FIG. 8a so as to, in principle, attain the same switching functionality as described with the aid of FIG. 8a. For example, a suitable planetary gear can be used with a corresponding braking device. These components can be combined in a suitable manner with the first coupling device 72.

Figure 9:
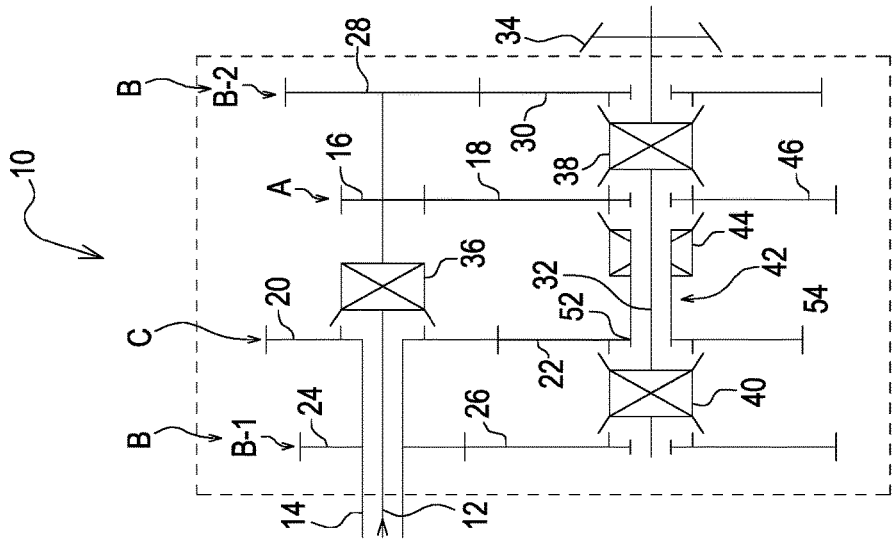
FIG. 9, a gear scheme of a group manual transmission according to the disclosure in another embodiment.

FIG. 9 shows another embodiment of the group manual transmission 10. In comparison to the variant according to FIG. 1a, the two gear pairs 16, 18, and 28, 30 are arranged interchanged here. This can have mechanical advantages with the transfer of the torque. In this embodiment, the coupling shaft 42 is designed as a hollow shaft and is arranged in a rotatable manner and coaxially with respect to the output shaft 32. In FIG. 9, the coupling-switch device 44 is in its interruption-switching position. As soon as it assumes the coupling-switching position, which is not depicted here, the coupling shaft 42 is drive-connected with the gear pair 16, 18 of the switch group A—that is, with the gear 18. The gear 18 hereby has the function of the coupling-gear 46 described above, so that here a direct drive-connection arises between the coupling shaft 42 and the gear pair 16, 18 without additional interposed components. With a shaft section 52 axially outside the coupling-switch device 44 or axially at a distance from the coupling-switch device 44, the coupling shaft 42 is non-rotatably connected, according to FIG. 9, with the gear 22. The gear 22 consequently assumes the function of the shaft-gear 54 described above. The gear 22 is arranged coaxially and rotatably with respect to the output shaft 32 and is a component of the gear pair 20, 22 of the switch group C. In the embodiment according to FIG. 9, therefore, no additional components are needed for the implementation of the creeper speed function within the group manual transmission 10, aside from the coupling shaft 42 and the coupling-switch device 44.

As described, it is possible, with the aid of the group manual transmission 10, as a function of the number of switch groups present, to attain a correspondingly finer gradation of the speeds and speed ranges with different traditional basic gears. For example, the 4-speed basic gear 64 according to FIG. 8a can be changed or expanded by means of the three switch groups A, B, C and the interposed gear unit 66 (two rpm stages) in twenty-four (4×2×3) speed stages. In addition, there is also the advantage of an additional creeper speed by means of the coupling stages 42 and the coupling-switch device 44.

This extent of a finer gradation of a traditional basic gear 64 is very efficient for many applications, in particular, with regard to an optimized traveling strategy (for example, savings in fuel) and an increased traveling comfort.

It should also be noted that the integration of the disclosed creeper speed function into a group manual transmission 10 is, of course, also possible if this group manual mission 10 has only one single input shaft, for example, only the input shaft 12 or the input shaft 14. Of course, then we do not have the advantage of a doubling of the speed stages of the basic gear 64 by two input-side rpm on the group manual transmission 10.

The invention claimed is:

1. A group manual transmission comprising:
   an input shaft and an output shaft;
   at least two switch groups, wherein each of the at least two switch groups comprises a gear pair;
   wherein gears of the gear pairs of the at least two switch groups are coaxially arranged,
   wherein the input shaft is configured to be brought into a drive connection with the output shaft via one of the gear pairs of one of the at least two switch groups;
   a coupling shaft non-rotatably connected with a coupling-switch device for the acceptance of a plurality of switching positions, the plurality of switching positions comprising a coupling-switching position activating a creeper speed function and an interruption-switching position;
   wherein in the coupling-switching position, the coupling shaft is drive-connected with a first gear pair of one of the at least two switch groups for transfer of a power flow to the output shaft via the coupling shaft; and
   in the interruption-switching position, the drive connection between the coupling shaft and the first gear pair is interrupted.

2. The transmission of claim 1, wherein the coupling shaft in the coupling-switching position is drive-connected, via a coupling-gear, with the first gear pair.

3. The transmission of claim 2, wherein the coupling-gear is coaxially arranged on the output shaft and is designed as a gear of the first gear pair of the one of the at least two switch groups.

4. The transmission of claim 2, wherein the coupling-gear is arranged such that it meshes with the first gear pair of the one of the at least two switch groups.

5. The transmission of claim 2, wherein the coupling-gear is operatively connected with an adjacent gear, the adjacent gear being coaxially arranged next to a gear of the first gear pair, and the adjacent gear is non-rotatably connected with the gear of the first gear pair.

6. The transmission of claim 1, wherein the coupling shaft has a shaft section that is axially outside the coupling-switch device, wherein the shaft section is non-rotatably connected with a shaft-gear.

7. The transmission of claim 6, wherein the shaft-gear is coaxially arranged on the output shaft and is designed as a gear of a second gear pair of another of the at least two switch groups.

8. The transmission of claim 6, wherein the shaft-gear is arranged such that it meshes with a second gear pair of another of the at least two switch groups.

9. The transmission of claim 6, wherein the shaft-gear is operatively connected with an adjacent gear, the adjacent gear being coaxially arranged next to a gear of a second gear pair, and the adjacent gear is non-rotatably connected with the gear of the second gear pair.

10. The transmission of claim 1, wherein the coupling shaft is superordinate, according to the power flow, to the at least two switch groups.

11. The transmission of claim 1, wherein the coupling shaft comprises a hollow shaft.

12. The transmission of claim 1, wherein the input shaft comprises two input shafts, and wherein a gear of at least one gear pair of the at least two switch groups is coaxially arranged on each of the two input shafts.

13. The transmission of claim 12, wherein at least one of the coaxially arranged gears is non-rotatably connected with one of the two input shafts and is configured to be brought into a drive-connection with the other of the two input shafts.

14. The transmission of claim 1, further comprising a switch device on the output shaft being axially arranged between gears of two of the at least two switch groups, wherein the gears of the two of the at least two switch groups are rotatably supported on the output shaft and are configured to be brought into a drive-connection with the output shaft, as a function of an axial switching position of the switch device.

15. The transmission of claim 1, wherein the output shaft is designed as a differential-drive shaft for a drive of a wheel axle of a vehicle.

16. A transmission comprising:
    an input shaft;
    an output shaft;
    a first switch group comprising a first gear pair;
    a second switch group comprising a second gear pair, a first gear of the first gear pair coaxially arranged with a first gear of the second gear pair and the output shaft, a second gear of the first gear pair coaxially arranged with a second gear of the second gear pair and the input shaft;
    a coupling shaft; and
    a coupling-switch device non-rotatably connected with the coupling shaft and configured for a plurality of switching positions;
    wherein the input shaft is configured for drive connection with the output shaft via one of the first gear pair and the second gear pair;
    wherein the coupling shaft is configured for drive connection with the first gear pair and the second gear pair and transfer of a power flow to the output shaft via the coupling shaft in a coupling-switching position of the plurality of switching positions, the coupling-switching position activating a creeper speed function; and
    wherein the drive connection between the coupling shaft and the first gear pair and the second gear pair is interrupted in an interruption-switching position of the plurality of switching positions of the coupling-switch device.

17. The transmission of claim 16, wherein the coupling shaft in the coupling-switching position is drive-connected with the first gear pair via a coupling-gear.

18. The transmission of claim 16, further comprising a switch device on the output shaft being arranged between the first gear of the first gear pair and the first gear of the second gear pair, wherein the first gear of the first gear pair and the first gear of the second gear pair are rotatably supported on the output shaft and are configured to be brought into a drive-connection with the output shaft as a function of an axial switching position of the switch device.

19. The transmission of claim 18, further comprising a third switch group comprising a third gear pair, wherein a first gear of the third gear pair is coaxially arranged with the first gear of the first gear pair, the first gear of the second gear pair, and the output shaft, and wherein a second gear of the third gear pair is coaxially arranged with the second gear of the first gear pair, the second gear of the second gear pair, and the input shaft.

20. The transmission of claim 19, further comprising a second switch device on the output shaft being arranged between the first gear of the third gear pair and one of the first gear of the second gear pair and the first gear of the first gear pair, wherein the first gear of the third gear pair is rotatably supported on the output shaft and configured to be brought into a drive-connection with the output shaft as a function of an axial switching position of the second switch device.

\* \* \* \* \*